(12) United States Patent  
Bettle, III et al.

(10) Patent No.: US 9,421,502 B2  
(45) Date of Patent: Aug. 23, 2016

(54) APPARATUS AND METHOD FOR ENHANCED WASTEWATER TREATMENT

(71) Applicant: Absolute Aeration, Greeley, CO (US)

(72) Inventors: Griscom Bettle, III, Sarasota, FL (US); James Rhrodrick Key, Grove, OK (US); Ricky Eugene Roberts, Greeley, CO (US)

(73) Assignee: ABSOLUTE AERATION, Greeley, CO (US)

(*) Notice: Subject to any disclaimer, the term of this patent is extended or adjusted under 35 U.S.C. 154(b) by 125 days.

(21) Appl. No.: 14/260,440

(22) Filed: Apr. 24, 2014

(65) Prior Publication Data

US 2014/0319054 A1 Oct. 30, 2014

Related U.S. Application Data

(60) Provisional application No. 61/854,410, filed on Apr. 24, 2013.

(51) Int. Cl.  
*B01F 3/04* (2006.01)  
*C02F 3/28* (2006.01)  
(Continued)

(52) U.S. Cl.  
CPC ......... *B01F 3/04595* (2013.01); *B01F 3/04617* (2013.01); *B01F 13/0049* (2013.01);  
(Continued)

(58) Field of Classification Search  
CPC ............ B01F 3/04595; B01F 13/0049; B01F 3/04617; C02F 3/104; C02F 3/16; C02F 3/206; C02F 3/2866; C02F 2305/06; Y02E 50/343; Y02W 10/12; Y02W 10/15

USPC ............ 210/602, 615, 616, 617, 620, 242.2, 210/170.05, 220, 221.1, 221.2, 603  
See application file for complete search history.

(56) References Cited

U.S. PATENT DOCUMENTS 3,595,537 A * 7/1971 Kaelin ................ B01F 3/04773  
210/242.2  
5,772,886 A 6/1998 Bettle  
(Continued)

FOREIGN PATENT DOCUMENTS

RU 2 115 313 C1 7/1998  
RU 2 121 459 C1 11/1998  
(Continued)

OTHER PUBLICATIONS http://www.waterworld.com/articles/print/volume-30/issue-2/editorial-features/lagoon-logic-elimination-of-biosolids-build-up-through-biodredging.html, "Lagoon Logic: Elimination of Biosolids Build-up through Biodredging", printed Apr. 23, 2014.  
(Continued)

*Primary Examiner* — Fred Prince  
(74) *Attorney, Agent, or Firm* — Scully, Scott, Murphy & Presser, P.C.

(57) ABSTRACT

Systems and methods for treatment of wastewater in waste processing ponds and other enclosed bodies of water are provided. An aerator are configured to include a first set of concentric air hoses disposed at a first position between the water outflow lip and the water intake, the first set of concentric air hoses being in fluid communication with an air inlet disposed at a position on the upper float chassis above the surface level of the water; and a second set of concentric air hoses disposed at a second position between the water first set of concentric air hoses and the water intake, the second set of concentric air hoses being in fluid communication with the air inlet, wherein the first set of concentric air hoses and the second set of concentric air hoses emit jets of air bubbles into the water column between the water intake and the water outflow lip.

20 Claims, 16 Drawing Sheets

(51) Int. Cl.
*C02F 3/10* (2006.01)
*C02F 3/16* (2006.01)
*C02F 3/20* (2006.01)
*B01F 13/00* (2006.01)

(52) U.S. Cl.
CPC . C02F3/104 (2013.01); C02F 3/16 (2013.01); C02F 3/206 (2013.01); C02F 3/2866 (2013.01); *C02F 2305/06* (2013.01); *Y02E 50/343* (2013.01); *Y02W 10/12* (2015.05); *Y02W 10/15* (2015.05)

(56) References Cited

U.S. PATENT DOCUMENTS

| | | |
|---|---|---|
| 7,329,351 B2 | 2/2008 | Roberts et al. |
| 8,298,411 B2 | 10/2012 | Roberts et al. |
| 8,372,277 B2 | 2/2013 | Kania et al. |
| 2007/0039878 A1* | 2/2007 | Roberts ............... B01F 3/04609 210/605 |
| 2010/0320145 A1* | 12/2010 | Key ....................... A01K 63/04 210/615 |

FOREIGN PATENT DOCUMENTS

| | | |
|---|---|---|
| RU | 2 135 670 C2 | 1/2008 |
| WO | 98/27015 A1 | 6/1998 |

OTHER PUBLICATIONS http://www.wateronline.com/doc/novel-technology-mimics-nature-simplifies-biosolids-management-0001, "Novel Technology Mimics Nature, Simplifies Biosolids Management", printed Apr. 23, 2014.
International Search Report dated Aug. 28, 2014, issued in International Patent Application No. PCT/US2014/035221.

* cited by examiner

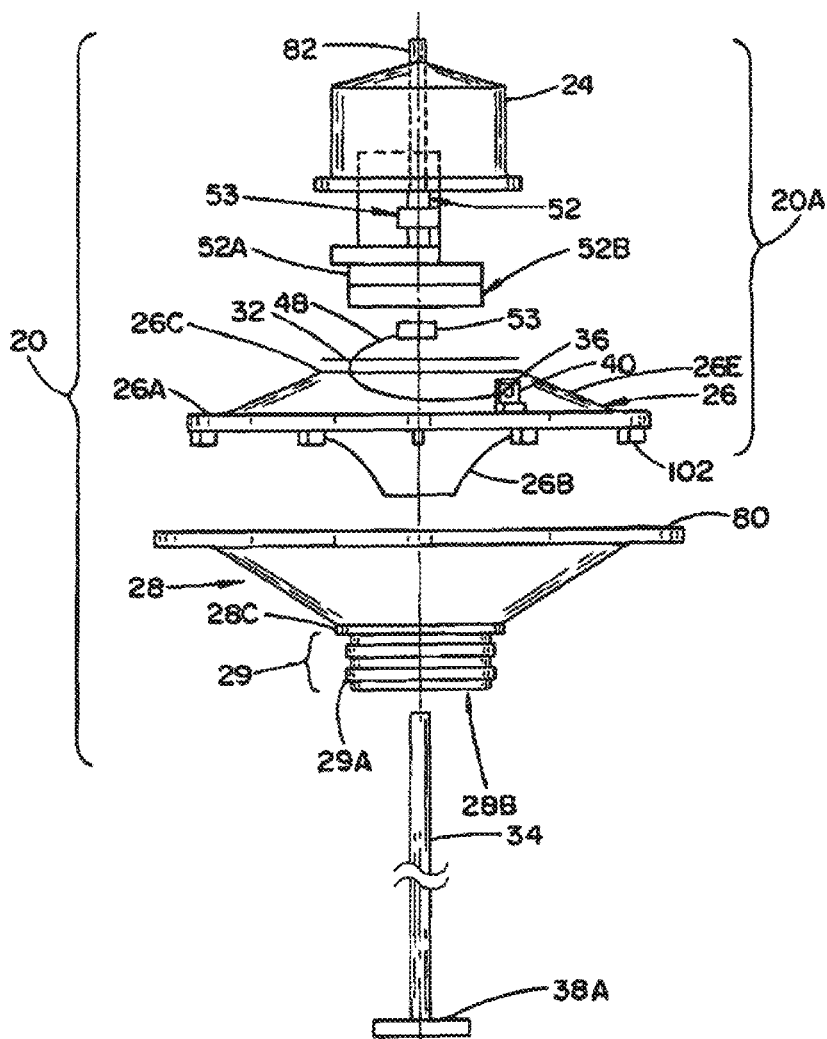

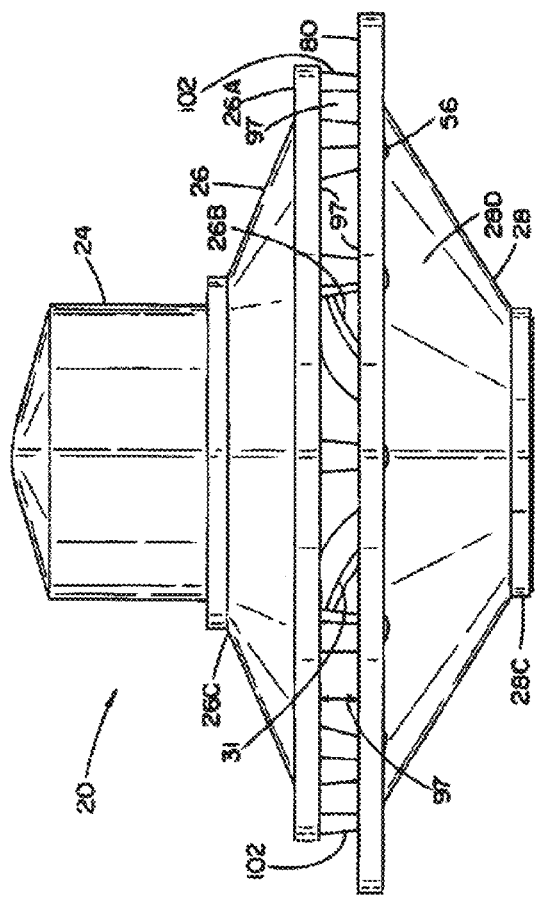

APPARATUS AND METHOD FOR ENHANCED WASTEWATER TREATMENT

CROSS-REFERENCE TO RELATED ART

The present disclosure claims priority from related U.S. Provisional Patent Application No. 61/854,410 filed on Apr. 24, 2013, and which is incorporated herein by reference in its entirety.

FIELD OF THE DISCLOSURE

The present invention relates generally to systems and methods of waste treatment. More specifically, the present invention relates to a system and method for treating wastewater.

BACKGROUND OF THE DISCLOSURE

Wastewater remediation is a broadly studied art with many innovations. Waste is treated aerobically, anaerobically or both. Inherent in the prior art is accumulation of biomass, called biosolids or sludge. It is costly and difficult to treat biosolids because the contents are virtually unknown and unknowable. Therefore, much of the biosolids are concentrated, digested, composted, land applied or entombed in landfills and the like.

Aerobic systems are well known. They usually involve oxygen-addition, return activated sludge (RAS) as a source of active aerobic bacteria, a mixing step and a clarification step. Some of the clarified solids are returned as RAS or are wasted (WAS).

Anaerobic systems are well known. A common reactor design is the Up-flow Anaerobic Sludge Bed (UASB). Wastewater is pumped into a granular sludge bed to fluidize the granules. Fluid flow allows the gas to escape and the granules return to the fluidized bed. The granules self-form or can be introduced from an outside source.

The biochemistry of biofilms on minerals is well known. A solid mineral is formed (or introduced as a seed crystal). Bacteria colonize the surface. The first colonizers die as they make a sacrificial glue to bond the biofilm to the surface. More colonizers form a synergistic organized collection of bacteria. Bacteria secrete a biopolymer that can bind small mineral crystals to the surface, building up a granule.

Attached growth surfaces are well known. In creeks, for example, slime grows on rocks as flooded aerated water flows by generally in one direction (downhill). In trickling filters, wastewater trickles down over rocks while air is bubbled up from below. Trickling filters are not flooded. An entire ecosystem grows in the thin, aerated film that grazes on the dead and dying attached bacteria. The grazing keeps the trickling filter from fouling.

More recently Kania et al., U.S. Pat. No. 8,372,277 (Kania '277), disclosed a floating streambed of a permeable matrix flooded by flow from a circulator, with or without added air and intended to de-stratify the water column. Kania '277 teaches flow through the permeable matrix. However, a periphyton layer grows over the surface, requiring periodic cleaning.

Circulators are well known (Roberts et al., U.S. Pat. Nos. 8,298,411 and 7,329,351). Impingement aeration to make fine bubbles is also known (Bettle U.S. Pat. No. 5,772,886).

Granules are common in up-flow anaerobic reactors but are not common in ponds as there are no seeds to start the process.

SUMMARY OF THE DISCLOSURE

An embodiment of the present invention includes a circulating apparatus comprising an upper float chassis with a wider lower base thereof being equipped with an annular water outflow lip at essentially the surface level of the water; motor-driven means being mounted on the upper float chassis for drawing water into a water intake at a lower open end of the circulating apparatus for effectuating a flow of the water over the water outflow lip; a first set of concentric air hoses disposed at a first position between the water outflow lip and the water intake, the first set of concentric air hoses being in fluid communication with an air inlet disposed at a position on the upper float chassis above the surface level of the water; and a second set of concentric air hoses disposed at a second position between the water first set of concentric air hoses and the water intake, the second set of concentric air hoses being in fluid communication with the air inlet, the second set of concentric air hoses being horizontally offset from the first set of concentric air hoses such that air bubbles emitted by the second set of concentric air hoses rise to the surface level of the water between adjacent centric air hoses of the first set of concentric air hoses. The first set of concentric air hoses and the second set of concentric air hoses emit jets of air bubbles into the water column between the water intake and the water outflow lip.

A further embodiment of the present invention includes a circulating apparatus comprising an upper float chassis with a wider lower base thereof being equipped with an annular water outflow lip at essentially the surface level of the water; motor-driven means being mounted on the upper float chassis for drawing water into a water intake at a lower open end of the circulating apparatus for effectuating a flow of the water over the water outflow lip; and an air injector disposed between the surface level of the water and the water intake, the air injector comprising a pair of venturis configured with respective outflows directed to impinge on each other, the air injector being configured to emit a high volume of air bubbles more than 500 standard cubic feet per hour mixed with water.

An additional embodiment of the present invention includes a method of treating wastewater in a waste holding pond containing sludge. The method including operating a circulator with an unidirectional rotating impeller to introduce fluid flow cavitation; forming granule seeds composed of mineral salts selected for encouraging biofilm formation in an aerated shear field of the circulator; and discharging the granule seeds at the base of a water column of the waste holding pond.

Another embodiment of the present invention includes a system for treating waste water, which includes a circulator for circulating waste water within a water column of a waste treatment pond; and a plurality of granule seeds comprised of a polyvalent salt and adapted to foster facultative and anaerobic bacterial growth on an external surface thereof. The plurality of granule seeds are introduced into the water column to form an initial fluidized bed of granules, the granules being kept in suspension by upwellings of methane.

BRIEF DESCRIPTION OF THE DRAWINGS

These and other features, aspects, and advantages of the present invention will become better understood with regard to the following description, appended claims, and accompanying drawings wherein:

FIG. 1 illustrates an exploded schematic view of an embodiment of a Blue Frog™ circulator;

FIG. 1A illustrates an assembled view of the embodiment shown in FIG. 1;

DETAILED DESCRIPTION OF DISCLOSURE

Blue Frog™ Circulator

Figure 2:
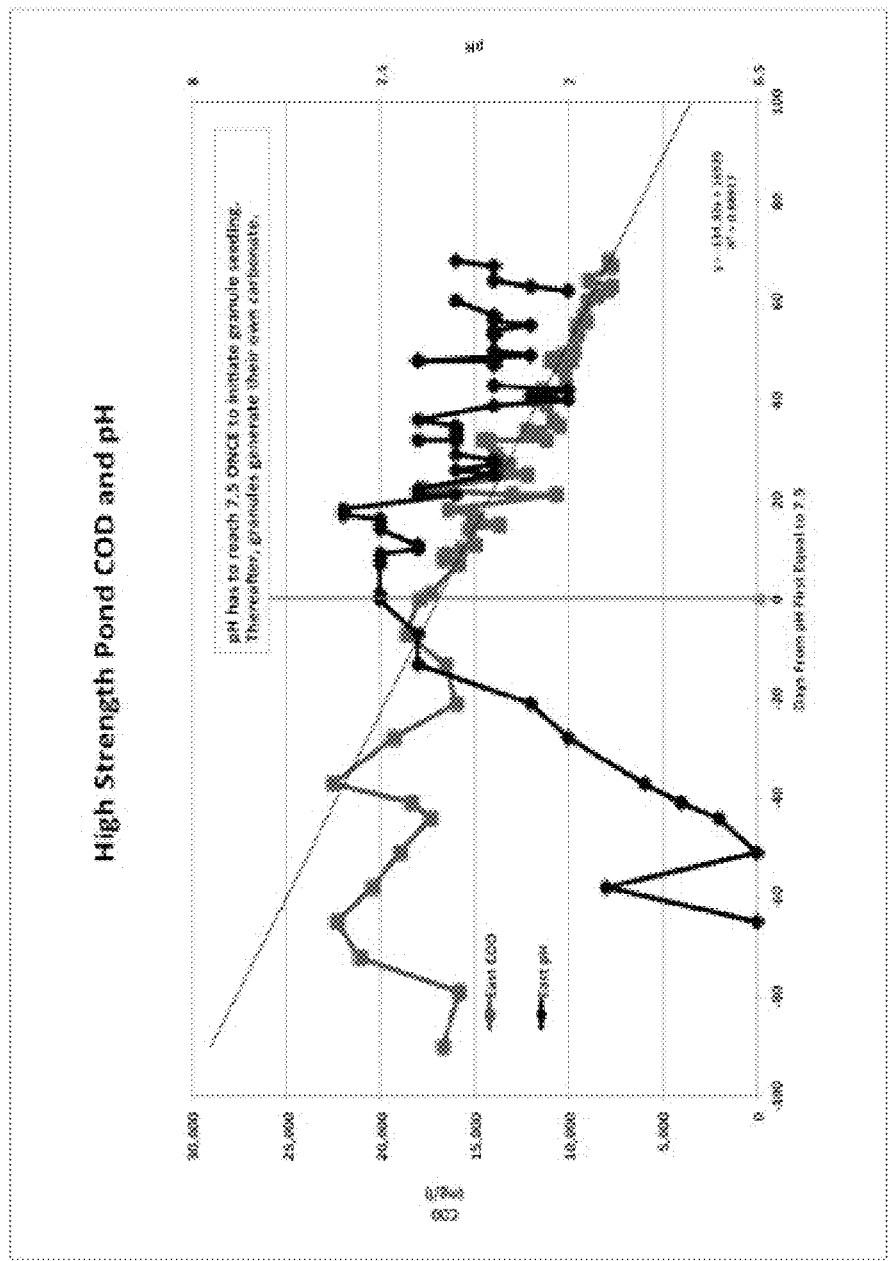
FIG. 2 illustrates a graph showing a change in chemical oxygen demand in a waste pool equipped with an embodiment of the present invention.

FIG. 1, an exploded view of circulator 20, illustrates most of the unit's components and their interaction. Diverter 28, the lower portion of the unit, includes an inverted frusto-conical shell of substantially circular cross section and substantially straight sides. It has a protruding edge around its upper periphery, outflow 80, which serves to guide water discharged from circulator 20 into laminar flow along the water surface. The lower, narrowest portion of the diverter has a collar 28C, below which is located a substantially cylindrical standard connection fitting 29, including concentric ridges 29A. Diverter intake 28B is located inside connection fitting 29. These components are discussed in detail below. Drive shaft 34 extends through diverter intake 28B and mounts at its lower end an impeller hub mount 38A to which is removably attached the impeller and a plurality of blades (not shown here). Drive shaft 34 is made of stainless steel or a similar strong, corrosion-resistant alloy, and is about 1½ inches in diameter in a present embodiment. Optionally, impeller 38A can be a helical screw.

Mounted above the diverter 28 is the circulator upper assembly 20A, with a float chassis 26, first including an upper frusto-conical shell 26E connected to a flat circumferential rim 26A, and mounting plate 32 mechanically attached to top surface 26C of float chassis 26 for use in mounting internal components discussed below. The float chassis 26 has a wider lower base portion formed by the base of the frusto-conical shell 26E and flat circumferential rim 26A. This wider base provides stability of the circulator in the water as well as accommodating the shape of the sectional diverter 26B attached to the lower portion of float chassis 26.

When the lower base portion and the upper lip are the same diameter, the radially outflowing water is formed into a wall which gravity can pull down and not radially. When the lower base portion has a diameter greater than the upper lip, the water profile is triangular. By the time the flow reaches the end of the lower base portion, there is a substantial horizontal vector and flow is radial away from the circulator.

The sectional diverter 26B resembles an inverted frustum of a cone with substantially parabolically curved sides inside and out. The upper edge of sectional diverter 26B connects to the bottom of float chassis rim 26A A plurality of supports 102 are integrally attached to the bottom of rim 26A to separate it from the outflow lip 80 when the float chassis 26 and diverter 28 are joined with mechanical connectors, as described below.

When assembled, the circulator 20 includes a motor cover 24 to protect the electric motor and other components, this cover being removably attached mechanically to the top of float-chassis 26. A lifting rod 82 is attached to the unit to facilitate moving the assembled unit. Lubrication for the rotating parts is provided by a Petromatic™ grease cup 40 held by grease cup holder 36 fastened atop the outer rim 26A of float chassis 26, with a grease line 48 directing grease to bearing 53. An electric motor 52 is mounted on motor mounts 52B and connects to gear reducer 52A to drive the impeller attached to the impeller hub 38A at a suitable speed via drive shaft 34.

FIG. 1a provides a detailed view of the assembled circulator 20, including motor cover 24, float chassis 26 and diverter 28. Cover 24 is removably mechanically connected to the upper surface 26C of float chassis 26. Supports 102 are preferably molded as integral parts of the underside of rim 26A of float chassis 26, but can optionally be fabricated separately and attached by any suitable mechanical means. Float chassis 26 and diverter 28 are mechanically connected by bolts 56 or other suitable mechanical connectors passing through bolt holes from the underside of outflow lip 80 into the undersides of supports 102. Supports 102 are of a height appropriate to optimize the flow of water discharged through the outflow spaces 97 between the underside of rim 26A of float chassis 26 and outflow lip 80 of diverter 28, and are streamlined. In one embodiment, outflow lip 80 is about six inches wide.

The diverter intake 28B, within which the impeller operates, takes up water into a progressively expanding annular passage defined by the conical interior of diverter 28 and the parabolically curved exterior of the sectional diverter 26B. The intake water then emerges through outflow spaces 97 onto outflow lip 80 to flow in omni-directional laminar flow fashion onto the surface of the water in which the unit floats. The buoyancy of the circulator is designed so that it floats at a level such that water surface is above outflow lip 80, with water covering at least a portion of outflow spaces 97, and water surface lying at about the level of the underside of chassis lip 26A or lower. This produces a laminar flow of water initially having a height of about the height of outflow spaces 97.

The width of outflow lip 80 can be varied in different models to optimize the production of laminar flow for various volumes and rates of discharge. For example, a four-inch outflow space and six-inch outflow lip are effective in producing laminar flow for a discharge of about 7 million gallons/day (MG/D) using about three horsepower in "mix mode" (i.e. impeller 38a runs counterclockwise). When the unit is operating in aeration mode, i.e. impeller 38A runs clockwise, the multiple plane surfaces of diverter 28 (28D) and the sectional diverter 26B (31), forming polygonal cross sections, are helpful in producing some bubbles in the water, which contribute to better mixing and aeration. In aeration mode the flow is 2 MG/D.

Connection fitting 29 below diverter collar 28C at the bottom of diverter 28 includes concentric ridges 29A and diverter inner surface inside (not shown in FIG. 1). Water can be taken up directly through diverter intake 28B or through an intake tube (not shown). Fitting 29 is designed to mate with a fitting for an externally corrugated/internally smooth intake tube.

Waste Processing Granules

Bacteria bond to mineral salts, e.g. $CaCO_3$, to form a biofilm anchored to rocks. The colonizing bacteria form a synergistic biofilm on the heavy mineral. The mineral salts selected for use as granules, which encourages biofilm formation. The inner bacteria are obligate anaerobes, e.g. Methanosaeta. The outer bacteria are facultative bacteria that hydrolyze biosolids into bio-liquids. The inner bacteria convert bio-liquids into gas and consume acid, raising pH.

The granule has interstitial fluid pathways to bring food in and waste out of the granule. The outer surface is facultative and these bacteria hydrolyze suspended solids that precipitate onto the granule. The solids become simple soluble compounds and wind their way into the granule interior. Fermenting bacteria serially shorten simple soluble compounds into acetic acid ($C_2$). Methane generating bacteria convert the $C_2$ acid into $C_1$ (3 moles of $CH_4$ plus 1 mole of $CO_2$) and consume 8 electrons and 8 protons (acid).

The methane escapes and fluidizes small granules. The produced $CO_2$ dissolves in water and is converted into $CO_3^=$. The methanogens consume acid, so the local pH is ≥7.5. The phase diagram for carbonate shows that $CO_3^=$ is first produced at pH=7.5. The fluidized granules are mixed vertically by the rising $CH_4$ but can also move horizontally to populate the entire pond bottom.

Without wishing to be bound, it is believed that the biochemistry of sludge digestion goes through the following steps. Waste is converted into living and dead bacteria by aerobic bacteria, producing $CO_2$. This step is very different for different substrates, as specialized bacteria are needed for specialized substrate (i.e. industrial waste). Dead bacteria are hydrolyzed to simple liquids by facultative bacteria. This is a ubiquitous step, since all bacteria have similar element ratios. Facultative and anaerobic bacteria serially ferment simple liquids into acetic acid ($C_2$), which lowers the pH in the pond.

Obligate anaerobes convert $C_2$ into $C_1$ (methane and carbon dioxide). Acid is consumed, raising the pH in the pond. If the methanogens are part of a biofilm, $H_2$ production is also minimized. In the presence of Sulfur Reducing Bacteria (SRB), $H_2$ is converted to $H_2S$. When $H_2$ is not formed, SRB remain inactive, thus preventing production of $H_2S$.

Up-flow reactors are used with suspended beads, also known as granules, to digest sludge. These granules can be manmade or naturally occurring. Naturally occurring granules have obligate anaerobes in the interior to convert liquid biochemical oxygen demand (BOD) into gas. A superficial coating of facultative bacteria consumes trace oxygen and converts biosolids (sludge) into liquid BOD. The anaerobes are protected from toxic oxygen by the oxygen scavenging of the facultative surface bacteria.

An embodiment of the present invention mimics up-flow reactors in waste treatment lagoons. Granules are multi-valence cation mineral based, primarily $CaCO_3$, calcium phosphate of many moieties and more complex minerals like struvite (magnesium based mineral). In the present invention, $CaCO_3$ seeds are formed in a high shear field in the presence of $Ca^{++}$ and $CO_3^=$ and air at a pH≥7.5.

Carbonate anion forms when the water pH is equal to or greater than 7.5. Once formed, the granules propagate naturally. The methane generators produce 3 moles of $CH_4$ and one mole of $CO_2$. The $CO_2$ dissolves and becomes local carbonate (at micro pH≥7.5). Calcium is ubiquitous in wastewater because humans use only a fraction of ingested calcium. The difference is excreted and available for granule propagation.

Calcium is also available in ancient sludge gels. The divalent cations bond to two carboxylic acids and form biopolymers. With the divalent structuring, recalcitrant sludge is hard to dewater. When the divalent cation is extracted, the structure collapses and bacterial attack is easy.

The rising methane fluidizes small granules, mixing them with substrate and calcium, mimicking an up-flow reactor.

In an embodiment of the present invention the combination of two distinct biofilms, one aerobic and one anaerobic meets modern discharge requirements, particularly at low temperatures. The strategy employed in the embodiment is to have an aerated permeable matrix with a dissolved oxygen (DO) level greater than 1 mg/l, wherein water flows substantially parallel to a vertical permeable matrix in fluid communication with a granular anaerobic biofilm at the base of the water column.

Permeable matrices with significant cross flow velocity are susceptible to fouling and need periodic cleaning. The vertical aerobic biofilm develops a natural ecosystem that includes grazers, shavers and filter feeders (e.g. sludge worms, insect larvae and nematodes) that eat bacteria. The worm castings are dense and sink rapidly, transferring substrate to the anaerobic granules.

The facultative granule's exterior hydrolyzes the castings into liquids while the interior converts liquids sequentially into gas and consumes acid. In the natural process, the final conversion from acetic acid ($C_2$) into methane ($C_1$) consumes acid and raises the pH. Produced $CO_2$ becomes $CO_3^=$ and eventually $CaCO_3$. The granules grow and propagate. However, the granules only form once the micro pH reaches 7.5.

In FIG. 2, the vertical line at zero days is the first day in which the pH=7.5. Prior to this date, the chemical oxygen demand (COD) was random; after this date, COD declined linearly. Colonizing bacteria that form the gas-forming biofilm populate the granules, once formed. The acid-consuming granule then creates $CO_3^=$ anions locally to allow granules to grow. The small granules are fluidized by produced gas and colonize the bottom of the entire pond. The large granules sit on recalcitrant sludge and slowly digest it.

Figure 3:
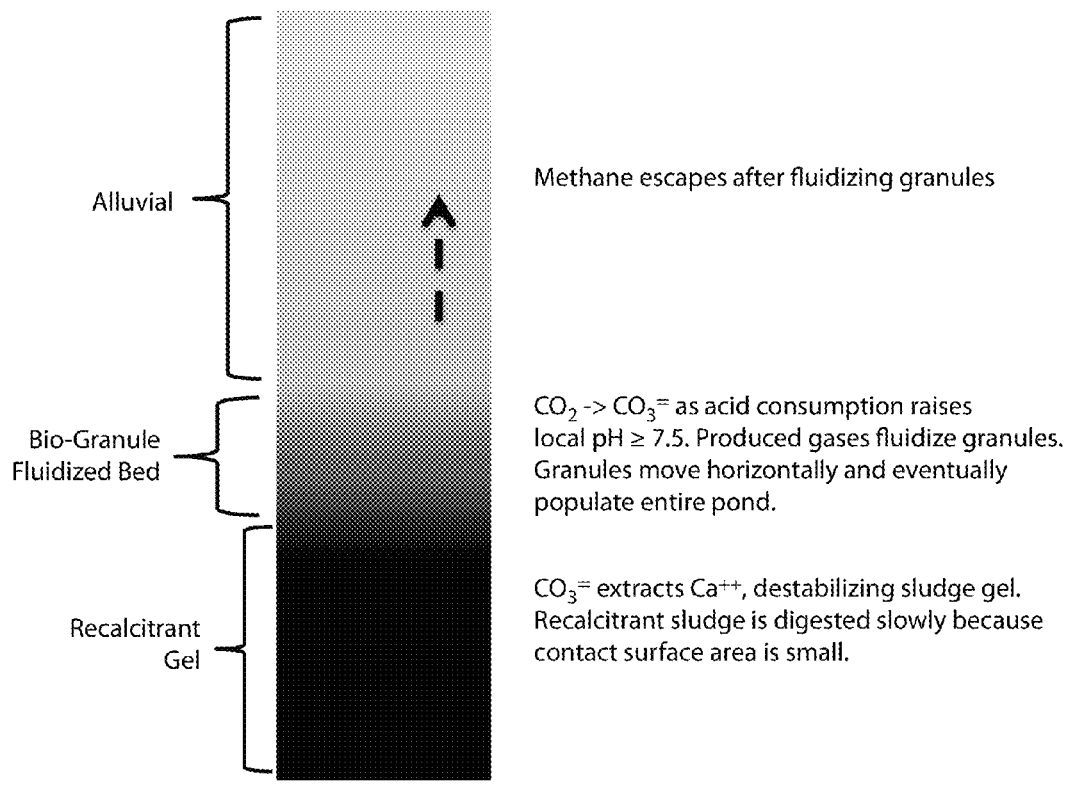
FIG. 3 illustrates a cross-sectional representation of sludge in a waste treatment pond in accordance with an embodiment of the present invention.

Sludge 300 (shown in FIG. 3) is a mixture of alluvial sludge 302, having total solids of less than 2.5%, and recalcitrant gelled sludge 304 comprising 2.5% or more total solids. The granules are sufficiently dense to pass through the alluvial sludge and sit on top of the recalcitrant gel to form a biogranule fluidized bed 306.

In am embodiment of the present invention, seeds are formed in the aerated shear field of a Blue Frog™ circulator (shown in FIG. 1) in which the impeller 102 runs in one direction only (unidirectional rotation), but fluid flow alternates from one direction to another (intentionally cavitates). Seeds (granule precursors) are discharged at the base of the water column as they exit the Blue Frog™ CSTR. The seeds grow and propagate as discussed above. Eventually the granular fluidized bed is intermediate between alluvial and gelled sludge. The alluvial sludge and granules are well mixed by produced gas. However, the gelled sludge is not.

The $CO_3^=$, indirectly produced by the granule, reacts with the $Ca^{++}$ stabilizing the gel to form $CaCO_3$. The immediate gel collapses to become alluvial sludge (i.e. un-stabilized sludge). The process is iterative over time. The gel layer thins and the granule bed increases.

Typical treatment pond sludge is composed of: 10.8% total solids, 30.2% volatile solids, 22,900 mg/kg TKN, 6,680 mg/kg Total Phosphorus, N/P of 3.4:1, pH of 6.59, 10,100 mg/kg Calcium, 782 mg/kg Magnesium, and no detectable amounts of Potassium and Sodium.

Typical VS of anaerobic digestate (residual digestible solids) is 50% VS. The inventive process are 30.2% VS. Typical VS of raw solids is 70%. This is a huge and unexpected change because the anaerobic digester is at elevated temperature (<35° C.) and the inventive process is <25° C. Note also the high $Ca^{++}$ and TP numbers, suggesting mineral formation. Also note that soluble cations have flowed out of the sludge ($K^+$ & $Na^+$ are ND). The total solids are 10.8%, much higher than would be expected (5-8% TS).

Figure 4:
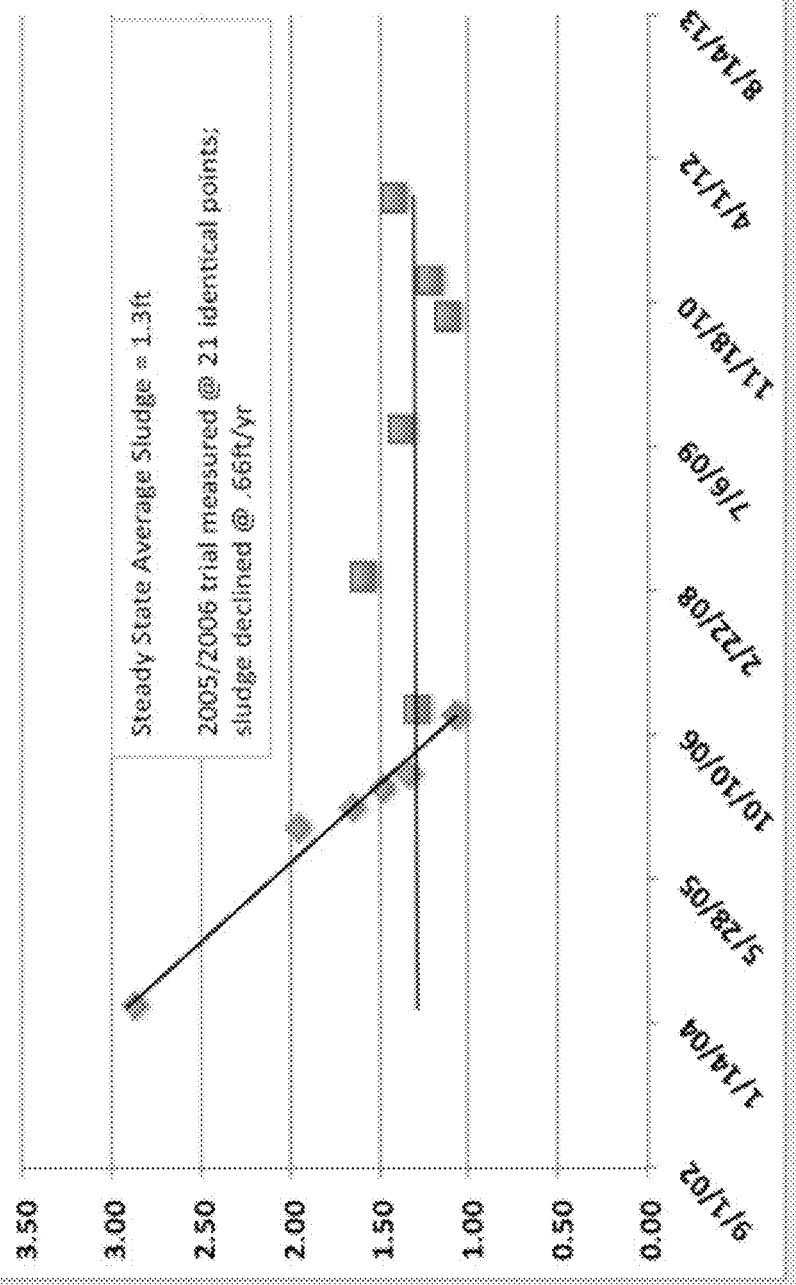
FIG. 4-12 illustrate graphs showing changes in waste pools equipped with embodiments of the present invention.

The graph of a waste treatment pond in Marshville, N.C. shown in FIG. 4 is a 7 year chart that shows two distinct sludge reduction zones: alluvial sludge and recalcitrant sludge.

The Marshallville, Ga. chart (shown in FIG. 5) is a two-year study of the sludge in a municipal pond. After two years of granule treatment, the residual sludge is 5" deep (mean).

The Lyon county chart (shown in FIG. 6) is a two-year study of a municipal sludge holding pond.

Figure 5:
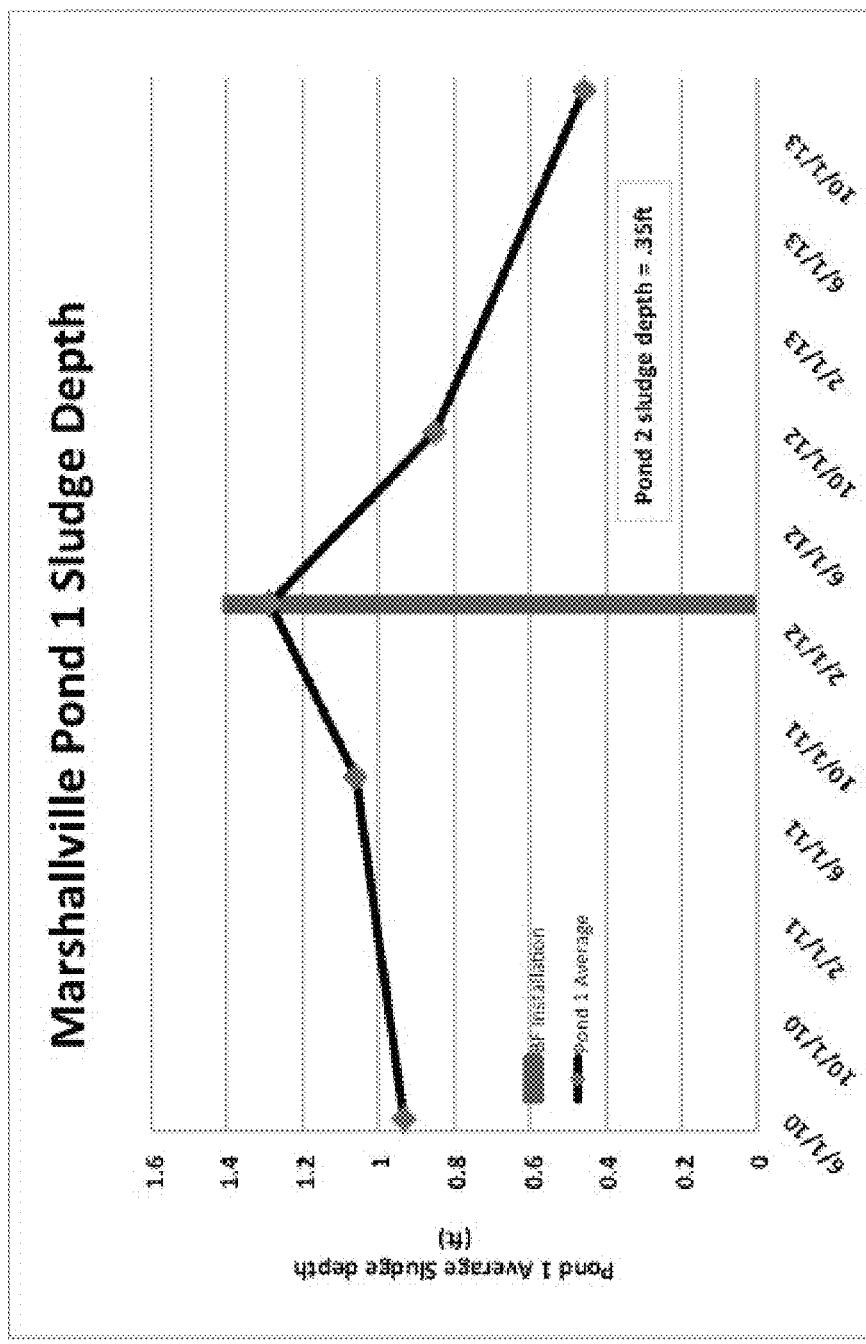
Figure 6:
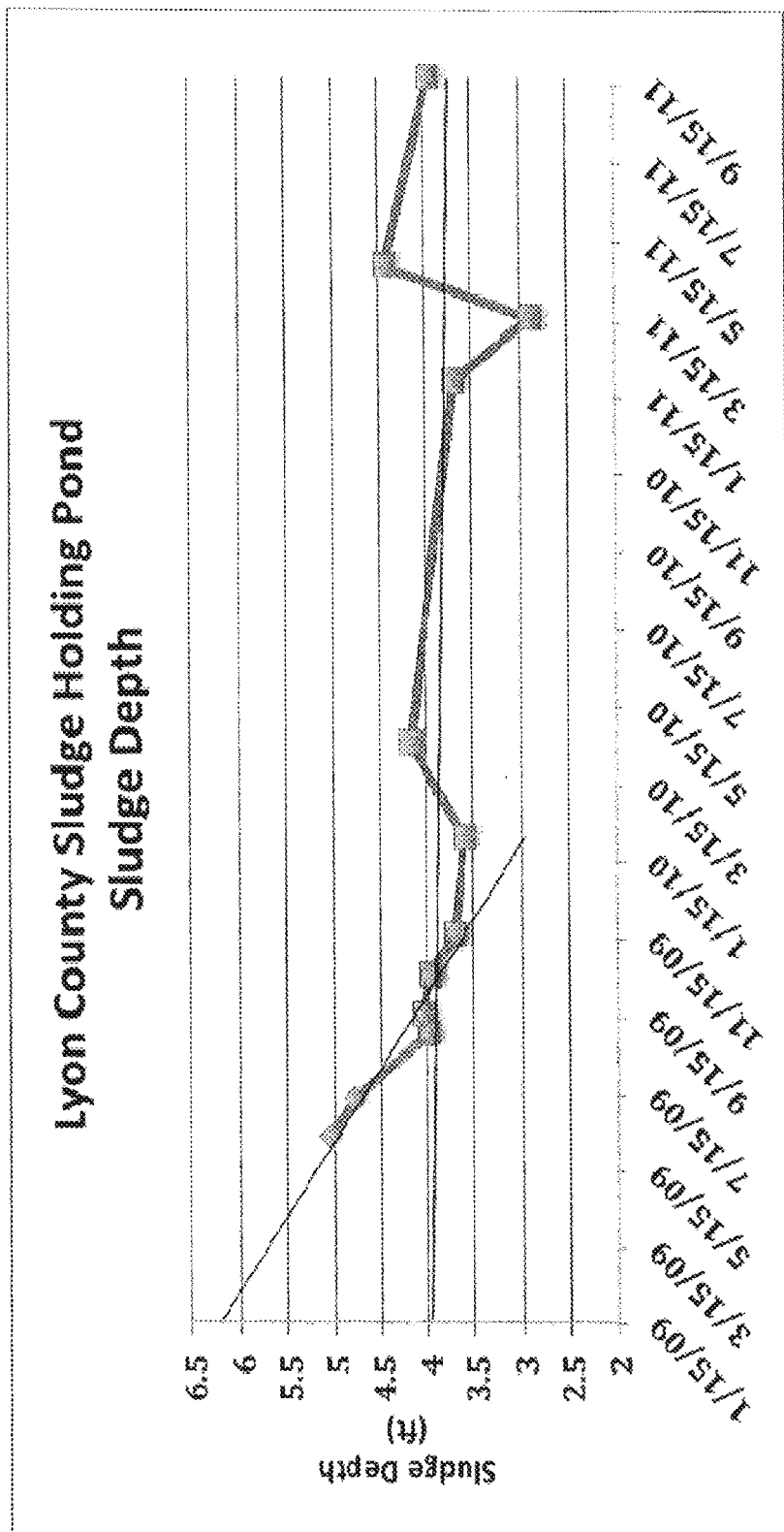

The charts of FIG. 4-6 show an initial sharp sludge decline due to digestion of alluvial sludge, and then a slow decline of recalcitrant sludge.

Figure 7:
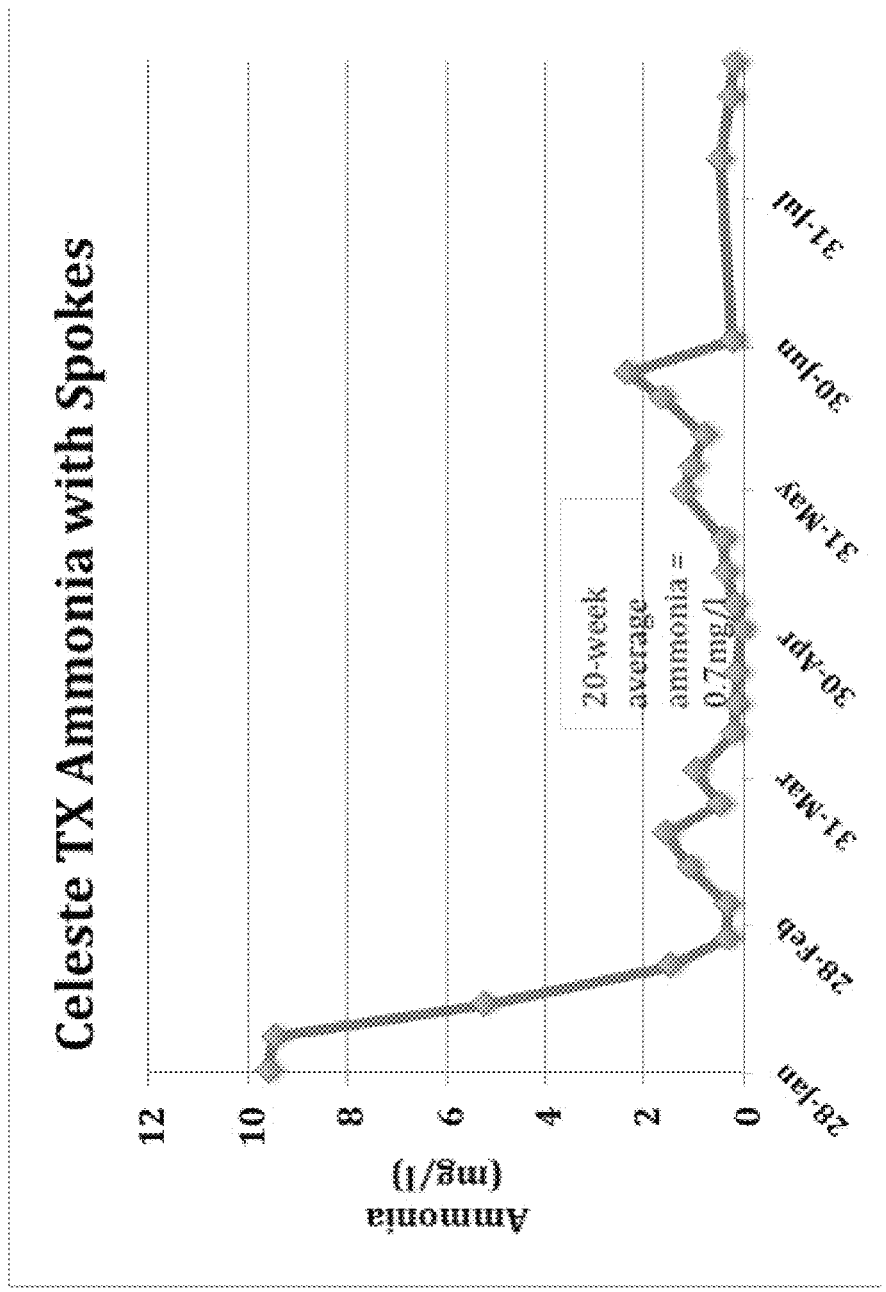
Figure 8:
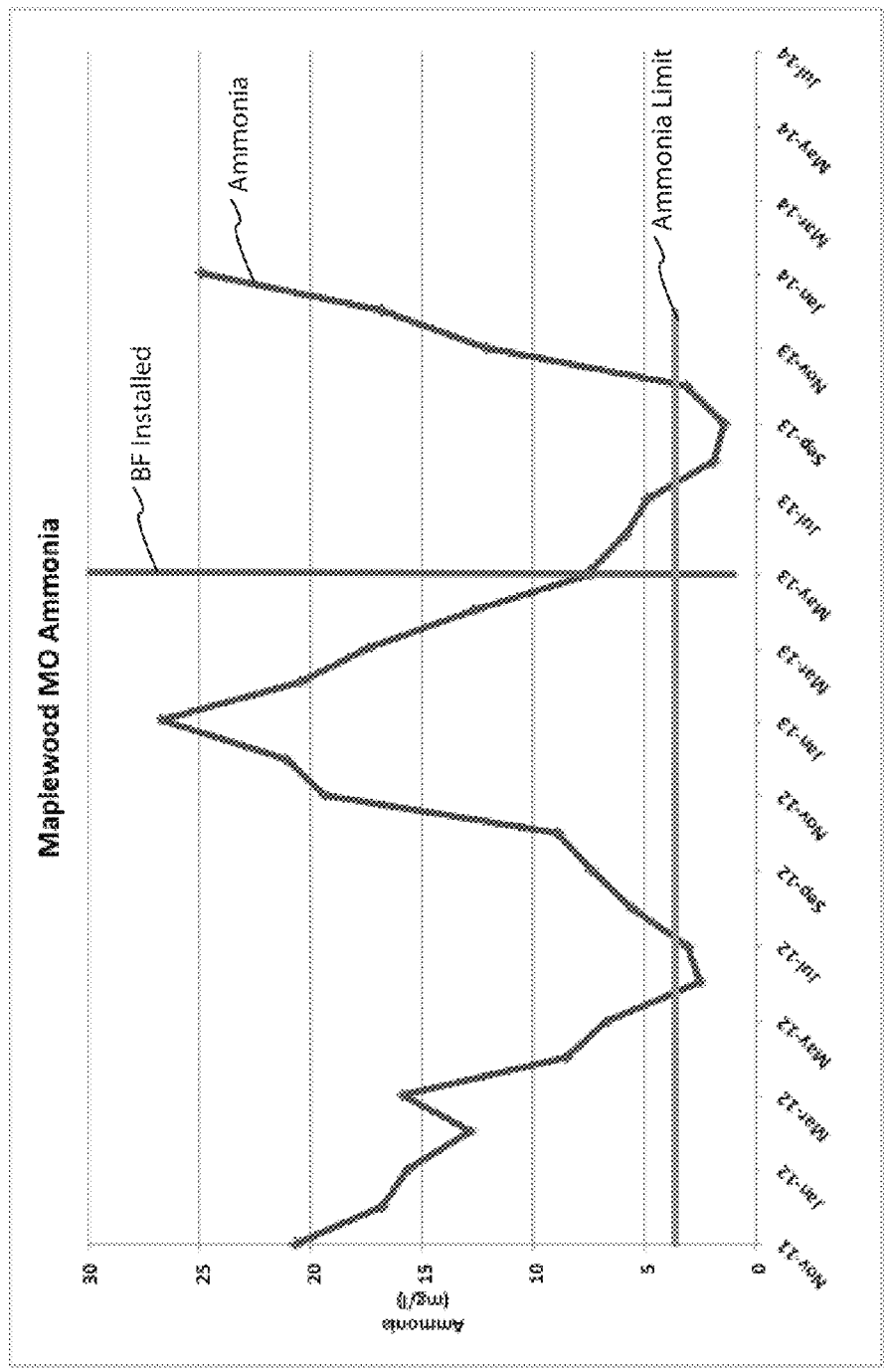
Figure 9:
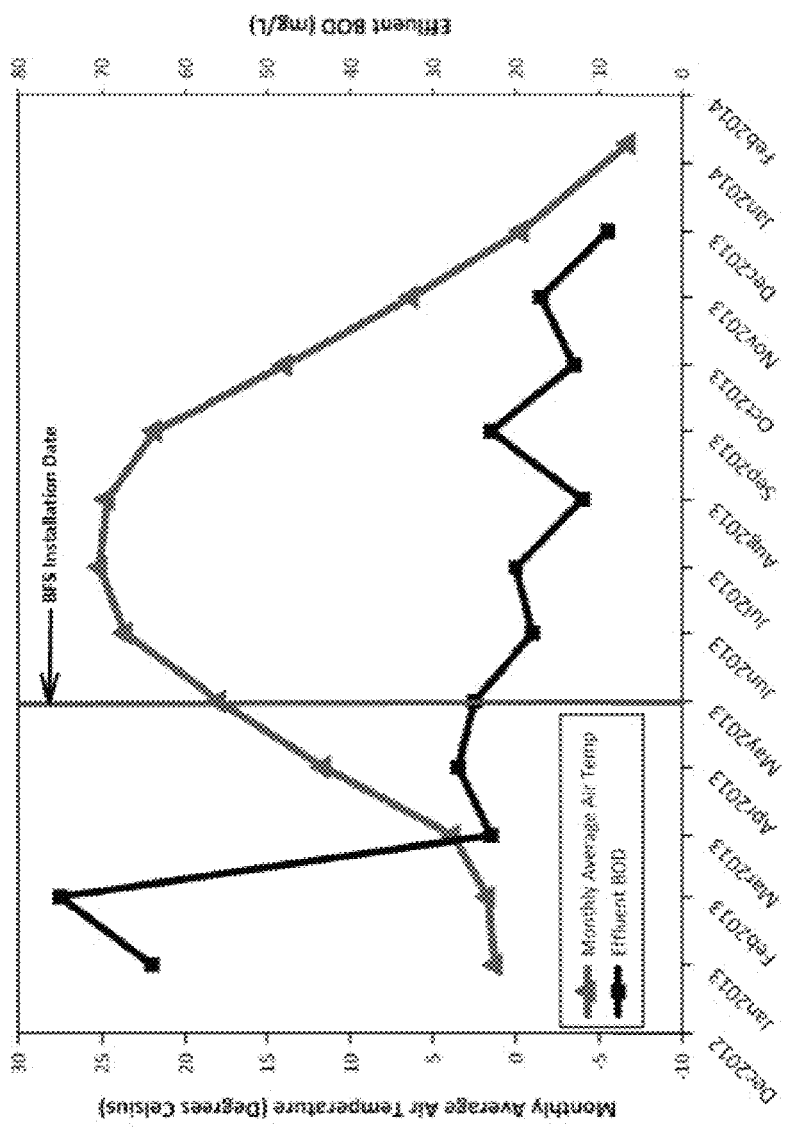

It should be noted that the embodiments of the present invention installed in the ponds of FIG. 4-6 do not include vertical attached growth surfaces in fluid communication with the granule bed. However, unexpectedly ammonia levels were greatly reduced to very low levels once vertical attached growth surfaces where introduced to ponds in addition to granule fluidized beds, as shown in FIGS. 7 and 8.

It is well accepted that bacterial activity shows a first order response by slowing when temperatures drop. For example, ammonia is well known to have a strong dependency with temperature. The nitrification bacteria responsible for ammonia generation are inactive at temperatures below 5° C.

Surprisingly, the reduction in biochemical oxygen demand (BOD) is independent of ambient temperature when an aerobic vertical surface is combined with horizontal anaerobic granules. BOD is the amount of dissolved oxygen needed by aerobic biological organisms in a body of water to break down organic matter at a specific temperature over a defined period of time.

The vertical surfaces provide substrates for colonization by aerobic bacteria in a surface biofilm. Additionally, worms and other aerobic organisms eat dead and dying bacteria. Thus, the surface biofilm is continuously rejuvenated. Moreover, heavy worm castings, i.e. organic matter digested by the worms, rapidly sink to the anaerobic granule biofilm at the bottom of the water column. As a result, food is transferred to the granules via the worm castings.

The rate-limiting step is conversion of castings into soluble BOD (hydrolysis). The facultative surface bacteria on the periphery of the granule perform the process of hydrolyzing the castings. The facultative bacteria, protecting the interior obligate anaerobes consume any toxic trace oxygen. The inner-granule anaerobic fermenters and gas formers convert soluble BOD sequentially into methane and $CO_2$. The rising methane and $CO_2$ gas fluidizes small granules and brings substrate and immature granules into intimate contact.

The produced $CO_2$ dissolves in water. Once the pH rises to at least 7.5 the $CO_2$ becomes $CO_3^=$. It should be noted however, that micro pH (pH at discrete points in the pond) may be higher than macro pH because the granules consume acid.

The carbonate extracts $Ca^{++}$ from the sludge gel, destabilizing it. The resultant $CaCO_3$ is used to increase the size of the granules and form new granules. The bacteria bind the $CaCO_3$ to the granule with a bacteria-produced glue to increase the size of the granule.

Once destabilized, the previously-recalcitrant gel becomes alluvial biosolids. Bacteria use the local $CaCO_3$ to form a biopolymer that glues the granule together. The methane gas rises through the water column to the surface, which fluidizes the gel-free immature granules.

The alluvial sludge is digested in situ. The granules are dense enough to sink through the alluvial sludge, but they do not penetrate the gel-structured recalcitrant sludge. After about one year, the alluvial sludge is digested leaving entering solids and recalcitrant sludge to be digested. The new sludge (i.e. incoming solids, aerobic produced biosolids and fresh worm castings) is alluvial because new biosolids rain down from above without yet forming a new gel. The granules have capacity to handle this load.

Recalcitrant sludge is difficult to digest because the granules are in intimate contact only on the substantially spherical granule's contact surface area with substantially flat recalcitrant sludge's gelled structure. Only the granule's lower surface, in direct contact with recalcitrant sludge, has the opportunity to digest. Thus, recalcitrant sludge is digested slowly.

At a final equilibrium, there are "only" granules on the pond floor. This process can be viewed indirectly by reviewing long term BOD data. Long-term BOD results can be divided into two zones: alluvial digestion and recalcitrant digestion.

Figure 10:
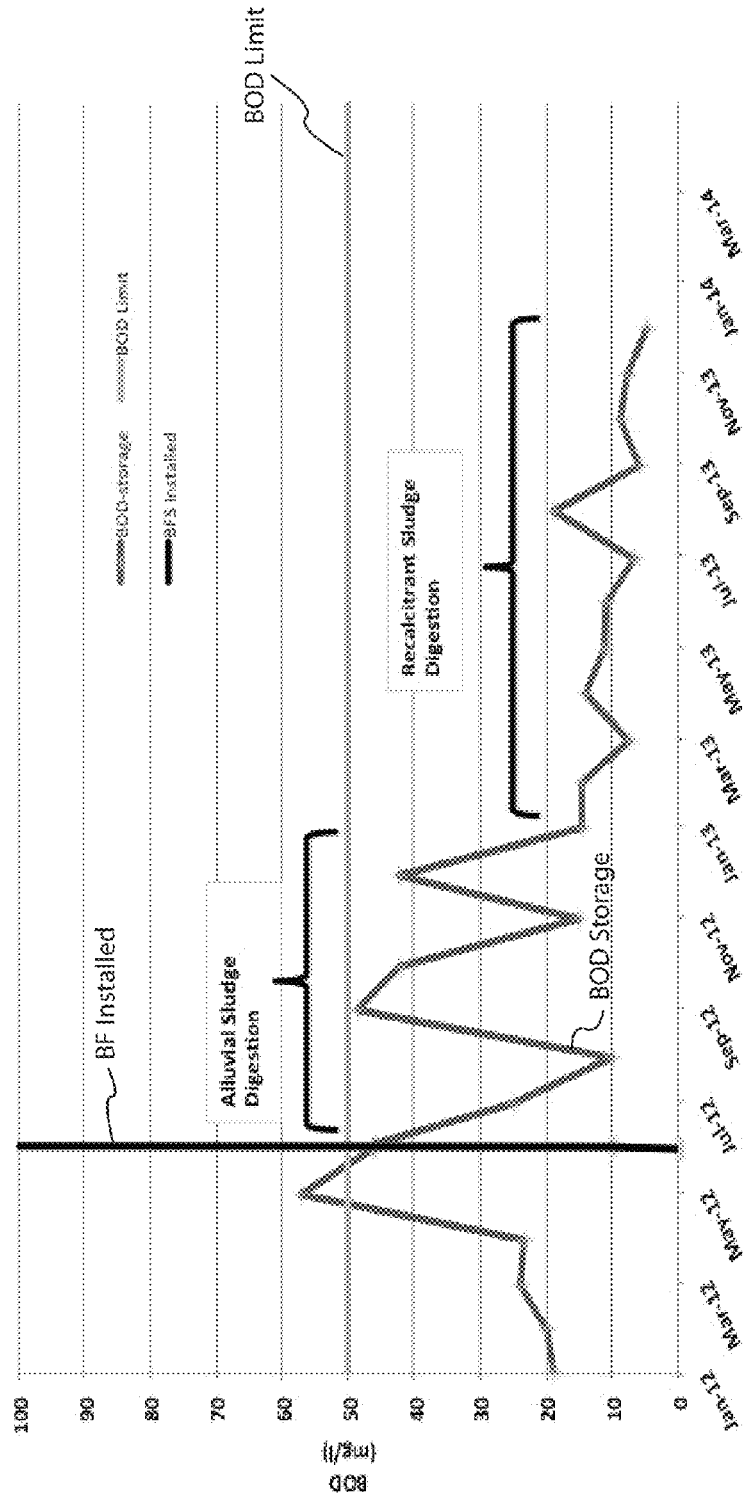
Figure 11:
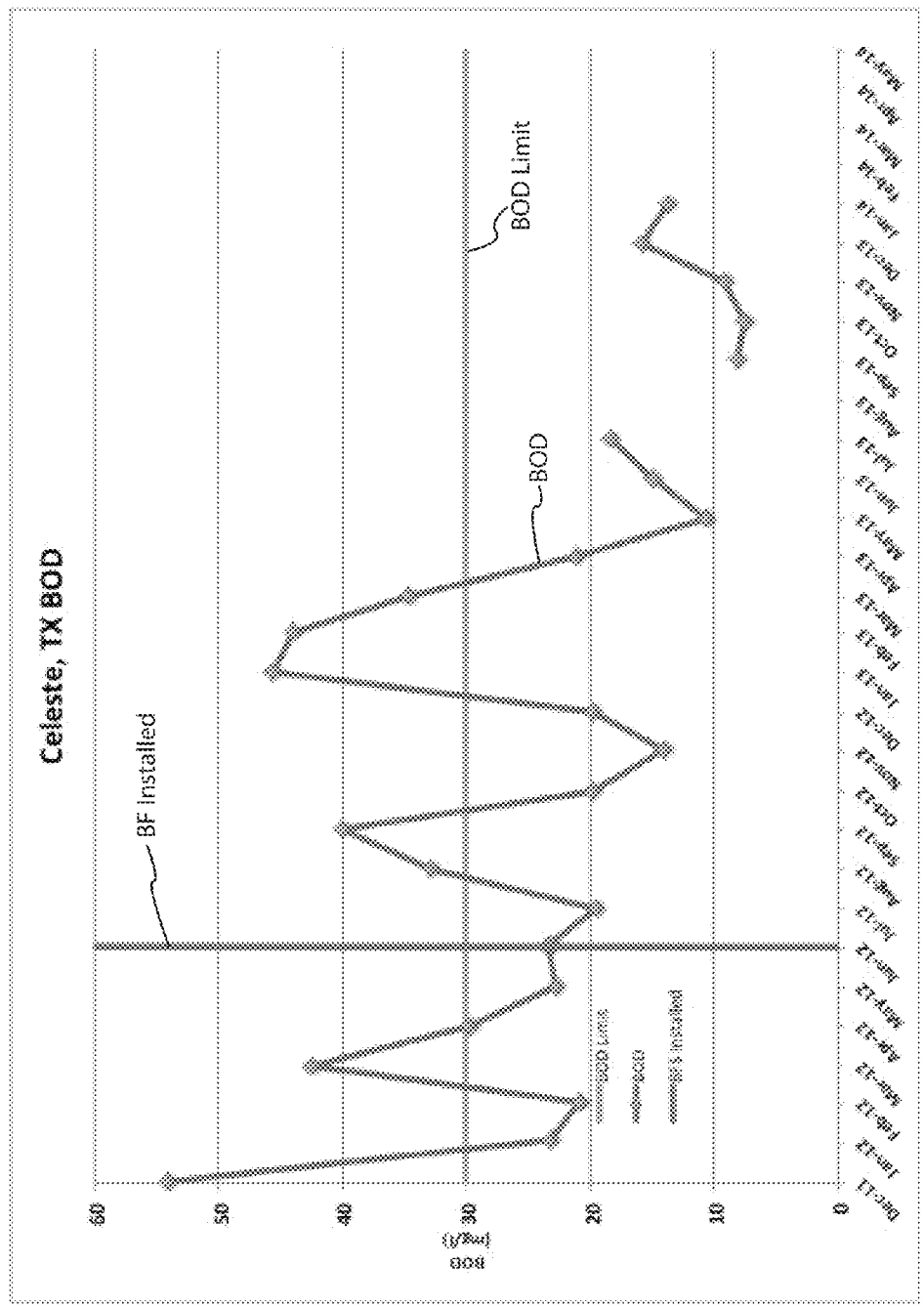
Figure 12:
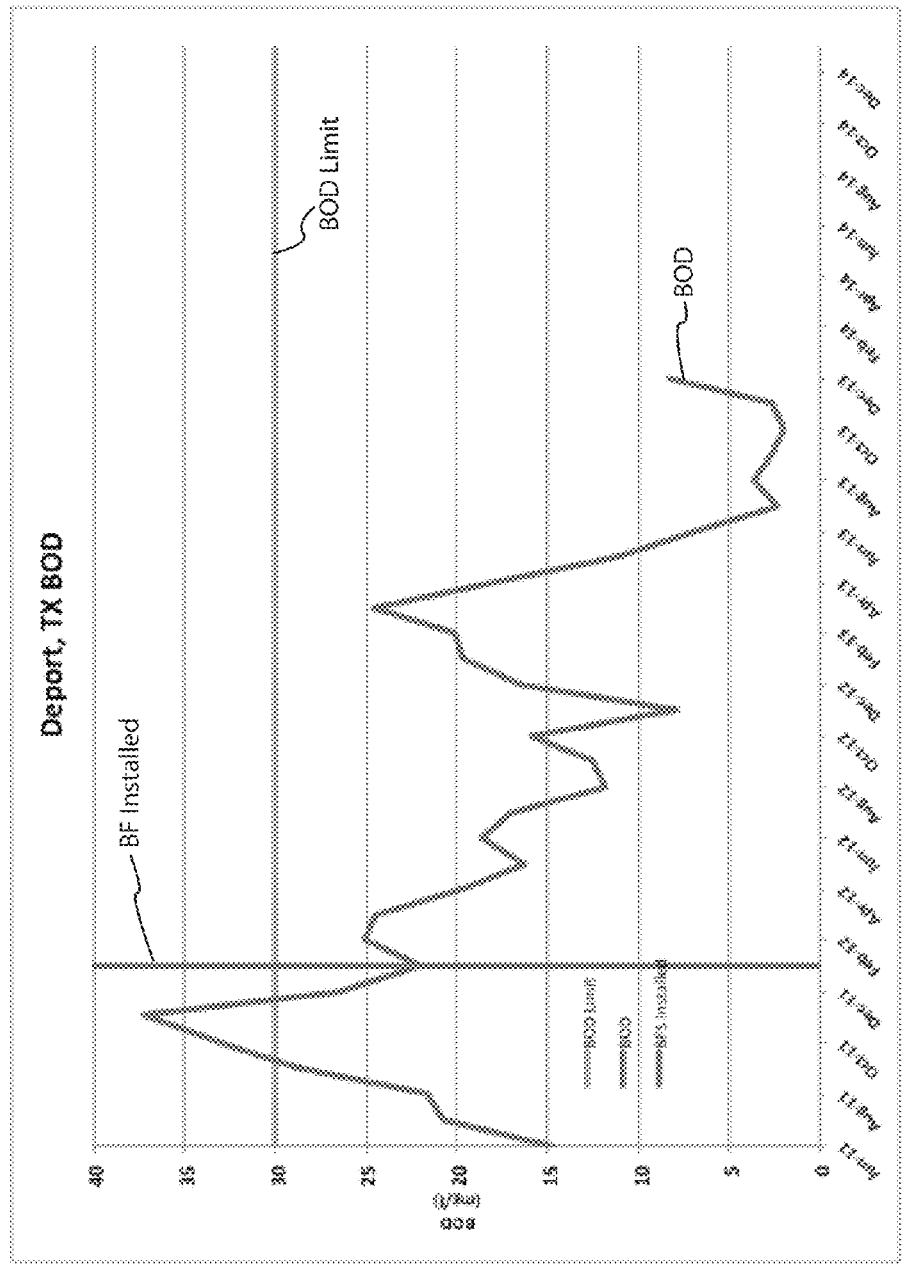

The vertical black line in FIG. 10 indicates installation of the Blue Frog System (BFS), a series of circulators with attached growth vertical spokes and a horizontal granule bottom. During the first 12 months, the BOD jumped up and down in a declining harmonic decay. As granules produced gas, some of the gas occludes to large solids and lifts them up to the surface in so-called sludge eruptions. The gas escapes, the structured gel breaks up, and rains back down, unstructured.

Some of the solids become soluble and/or suspended solids. The BOD & total suspended solids (TSS) peak. Soluble BOD is converted to solids and sinks causing the BOD to fall. Once the solids available to produce lifting-gas are digested, the system enters the recalcitrant sludge digestion phase. BOD varies, but the trendline is down into single digits.

The recalcitrant sludge depth is about 6 inches. The fluidized bed is 12-18 inches above the recalcitrant sludge blanket. This phenomenon is observed in other locations where granules are formed with vertical spokes.

Unexpectedly, an in-situ sludge-digesting process in which the combination of a vertical, self-cleaning immobile surface with a horizontal, mobile self-cleaning surface creates an environment where BOD reduction is independent of ambient temperature. The pH has to be greater than 6.2 and preferably at least 7.5. The vertical surface dissolved oxygen is greater than 0 mg/l.

Yellow Frog Aerator

Figure 13A:
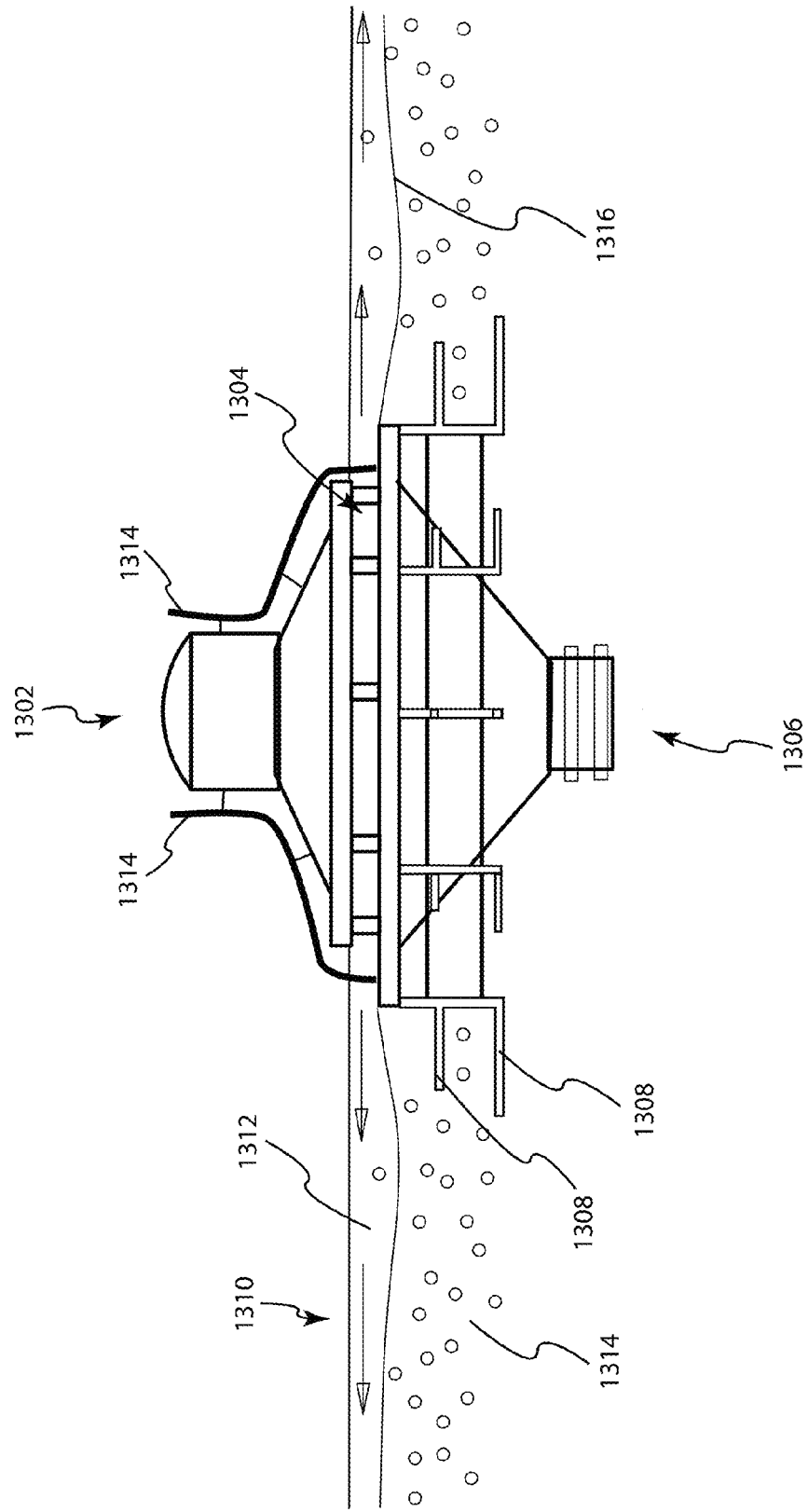
FIG. 13A-13C illustrate schematic representation of an aerator apparatus of the present invention.
Figure 13B:
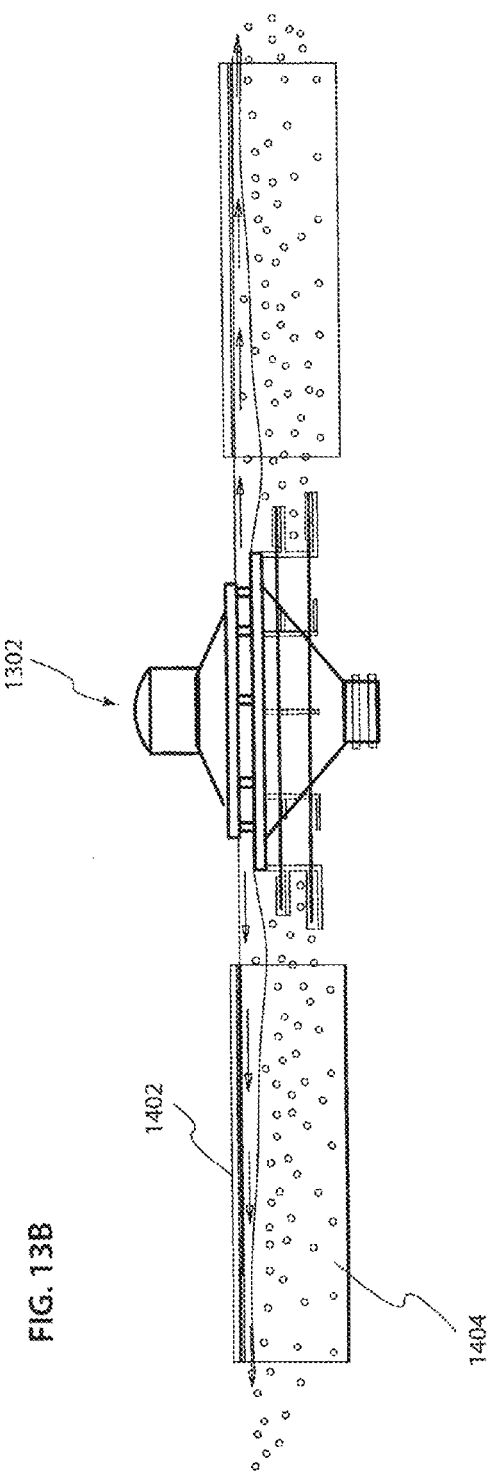
Figure 13C:
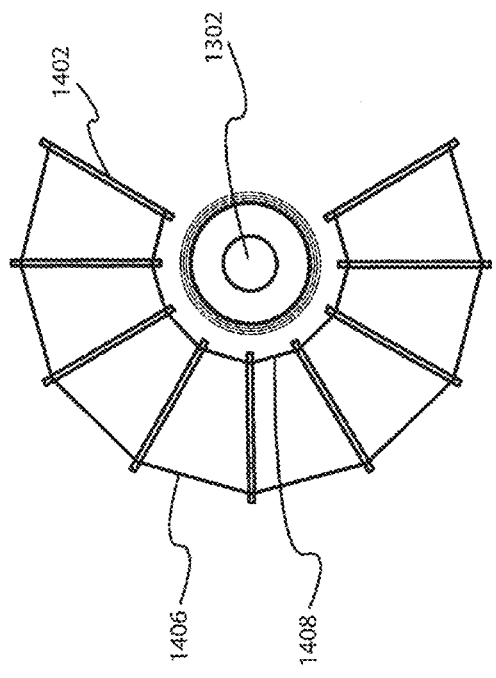

The yellow frog (YF) 1302 shown in FIG. 13A-13C is an apparatus for making vertical-rising bubbles move horizontal. Bubble escape velocity is proportional to bubble radius until the bubble is greater than about 1 mm. Thereafter the escape velocity is constant. The internal components of the YF 1302 are similar to those shown in FIG. 1, thus only distinguishing features will be described hereinbelow.

Aerators are historically designed to maximize droplet macro surface area (number of drops×area/droplet) in air, or make air bubbles small (greater macro surface area) and deep (more detention time for oxygen transfer). These strategies consume large amounts of energy by throwing water up into the air or pushing gas deep into the water column. Many inventions have been made to increase the oxygen transfer rate (OTR). OTR is a helpful way to measure efficiency in aerobic systems (lbs $O_2$/hp×hr).

OTR is an inelegant measure in hybrid systems wherein air is added, but much of the remediation takes place in anaerobic granules. OTR explicitly assumes that 100% of remediation is aerobic. For example if half the BOD were removed aerobically and half anaerobically, the reported OTR of the aerators would double.

It is well known that when bubbles rise to the surface, the elevation of the gas/liquid mixture rises and fluid flows radially away from the bubble. If bubbles are added in a line, e.g. from an aerator hose, the flow is left and right from the axis of the hose.

If droplets are thrown radially from a splasher aerator, the drops have a horizontal and vertical vector. The horizontal vector makes the fluid flow away from the splasher.

The YF 1302 is an improved aerator that decouples bubble formation and fluid flow. YF 1302 is a circulator with radial surface outflow 1304, a water intake 1306, air intake 1314, and two sets of four concentric rings of aeration hose 1308 connected to the air intake 1314.

The concentric rings 1308 are positioned at sufficient position apart below the surface of the water for the emission of microbubbles to rise between the aeration hoses of the upper set of concentric rings. In an embodiment, the concentric rings are positioned at about 9 inches and about 18" below the surface, respectively. In this configuration, the prior art would suggest that there is insufficient detention time for oxygen transfer (i.e. before the bubbles flowed up and out of the water column). Additionally, the lower (second) set of concentric rings 1308 are staggered with respect to the upper (first) set of concentric rings 1308, such that micro-bubbles emitted by the lower set of concentric rings 1308 rise between the aeration hoses of the upper set of concentric rings 1308. The above positioning of the concentric rings 1308 is intended for illustrative purposes. The upper concentric ring is positioned more than 2 times deeper in the water column than the depth of the water discharge from the radial surface outflow 1304 with respect to the surface of the water. At twice the depth, the air bubbles emitted by the upper set of concentric rings 1308 are below the wave/no wave interface created by the water discharge.

In an embodiment, each of the two sets of concentric rings 1308 is connected to a respective air intake 1314, such that the flow between the upper set of concentric rings 1308 and the lower set of concentric rings 1308 is equalized. Since there is a 9 inch gap between the upper set of concentric rings 1308 and the lower set of concentric rings 1308, higher air pressure is needed to push air to the lower set of concentric rings 1308.

The bubbles are externally produced at an intermediate elevation between the aerator inlet and outlet. If the bubbles are produced below the inlet, the bubbles get sucked into the inlet and coalesce. If the bubbles are produced above the outflow, the bubbles escape and do not flow horizontally.

As shown in FIG. 13A, the water exiting from radial surface outflow 1304 is introduced below the water surface 1310. Additionally, the introduction of micro air bubbles into the water column creates a region of low viscosity 1314 in comparison to the surrounding water. Thus a boundary 1316 is created between the typical, high viscosity water 1312 and lower viscosity aerated water 1314. This boundary 1316 acts to dampen the rate of rise of the micro air bubbles. As a consequence the micro air bubbles are directed horizontally for an extended distance before reaching the water surface 1310.

Radially outflowing, well-mixed, water hydraulically redirects rising bubbles horizontal, i.e. redirection is not with machines or steering means. Bubbles less than 1 mm radius are re-entrained in the diverging surface flow lines. The diverging flow lines separate individual bubbles one from another to prevent coalescing and consequent loss of macro surface area.

The radial, well-mixed, substantially gas-free, outflow is non linear and eddies are formed that continuously re-entrain bubbles of less than 1 mm radius. When small bubbles are re-entrained, detention time is increased sufficiently for oxygen to transfer to the water.

In an embodiment of the YF aerator 1302, only one set of concentric rings 1308 is provided. In another embodiment more than two sets of concentric rings 1308 are provided, each disposed at different vertical positions.

Additionally, an embodiment of the YF aerator 1302, as shown in FIGS. 13B and 13C, is in fluid communication with radial, vertical, semi-permeable, attached growth surfaces 1404 disposed from radially extending spokes 1402. For clarity of the structure, FIG. 13B only shows two spokes 1402 and growth surfaces 1404 attached to the floating spoke and hanging vertically down, with a weighted pipe at the lower edge of the growth surfaces 1404 that keeps the growth surface substantially vertical. However, in actuality the YF 1302 of the present invention has a plurality of spokes 1402, as shown in FIG. 13C, extending radially from the central axis of the YF 1302 and spaced at intervals about the circumference of the YB 1302. With the growth surfaces 1404 disposed as shown in FIG. 13B, large radius bubbles, greater than 1 mm radius, obstructed from reaching the water surface for a period of time sufficient to discharge their oxygen to the attached growth surface. The attached growth has a DO greater than 1 mg/l for a spoke length of 15 feet. The spokes 1402 and growth surfaces 1404 are optionally equipped on the YF 1302 when a specific waste treatment project would benefit from the additional vertical growth surfaces as discussed above, for example if carbon and or nitrogen reduction is desired. Thus, the YF 1302 of the present invention encompasses both embodiments with and without the spokes 11402 and growth surfaces 1404.

As shown in FIG. 13C the spokes 1402 are not mechanically connected to the YF 1302, but rather float freely and substantially encircle the YF 1302. In the embodiment shown in FIG. 13C a large opening is provided at one side of the arrangement of spokes 1402 to allow easy access to and removal of the YF 1302. However, the spokes 1402 may, in an embodiment, form a completed circle around the YF 1302. Each of the spokes 1402 are connected to adjacent spokes 1402 by connecting members 1406 and 1408. Long connecting members 1406 are disposed on the outside perimeter of the arrangement, while shorter connecting members 1408 are disposed on the inside perimeter. This arrangement of connecting members 146 and 1408 forces the spokes into a radial configuration. The length of the long connecting members 1406 and short connecting members 1408 are determined by the length of the spokes 1402 and the desired angle formed between adjacent spokes 1402.

It was determined experimentally that aerobic conditions do not exist beyond spoke lengths of 15 feet. The anaerobic section grows a 10" thick slime that sinks the tip of the spoke. The spokes are intentionally shortened to insure that the entire growth surface is sufficiently aerated that the shavers and grazers have sufficient oxygen to thrive. For example, spokes may be 10 ft long, with a growth surface of 27" deep and 2" thick.

The aerobic matrix, i.e. the growth surface 1412, is self-cleaning as long as it is aerobic. The natural color of the matrix is black. The in-use color is tan.

The matrix total volume is populated with sludge worms, insect larvae and nematodes (round worms). The worms graze on the colonizing bacteria and eat the bacteria. The grazers keep the matrix clean (self-cleaning), if the DO is greater than 1 mg/l. This has a surprising result in that nitrifying bacteria can compete with carbon-consuming bacteria in a carbon-rich, aerobic environment. This has an enormous benefit in cold weather ammonia reduction.

The prior art teaches that nitrifiers cannot compete successfully with carbon bacteria, so processes must be designed with nitrification late in the process after all the incoming warmth has been lost. Cold weather ammonia reduction is unsuccessful when the attached growth surface is fouled with ice. However, warm water operation, where water temperatures are above 5° C., is very effective at ammonia reduction.

The unexpected result was to put the attached growth spokes in Cell1 where warmth is more important than competition with carbon bacteria. Nitrification bacteria do not perform at temperatures of less than 5° C., and carbon bacteria outcompete nitrification bacteria when the carbon bacterial population is huge (e.g. in an aeration basin with RAS ~5,000 mg/l TSS).

On a self-cleaning surface, the worms reduce the absolute bacteria count. In a traditional system, the carbon bacteria (heterotrophs) can grow 100× faster than the nitrification bacteria (autotrophs) such that they grow right over all the nitrifiers. This has the effect of increasing the oxygen diffusion resistance. By creating a self-cleaning environment, oxygen diffusion to the growth surface is increased, allowing nitrification bacteria to compete in a carbon-rich environment. Thus, there is surplus oxygen available for the slow growing nitrifiers. Consequently, competition between the nitrifiers and carbon bacteria for necessary oxygen is minimized. The various bacteria do not have to compete for scarce oxygen because oxygen is no longer scarce.

Instead of adding expensive oxygen to match the bacterial population, the self-cleaning spokes in fluid communication with diverging well-mixed aerobic water reduce the bacterial population instead.

The YF circulator pumps 7 MG/D of water through an annular space 4 inches high with a diameter of 7 ft (7.33 ft$^2$). The exit velocity is less than 2 ft/sec. Turbulent flow in clean water is typically established at velocities greater than or equal to approximately 7 ft/sec. Substantially non-turbulent flow leaves the YF flowing radially and horizontally away from the centerline of the YF. However, the impeller, turning a slow 144 rpm, imparts a slight counterclockwise curvilinear flow pattern with a distinct cross vector that moves water right-to-left as well as out from the centerline.

As water flows out from the YF 1402, coarse and fine bubbles rise vertically into the horizontal gas-free, non-turbulent water flow. The coarse and fine bubbles are entrained in the outflowing eddies to a diameter of 50 ft. Non-turbulent flow minimizes bubble coalescing. The bubbles remain in the water column much longer so there is sufficient detention time to transfer bubble-interior oxygen to the water. This results in a 5-fold increase in oxygen transfer efficiency to 3 lbs O$_2$/hp×hr.

The YF 1402 of the present invention provides the following improvements over prior art designs:

Non-turbulent outflow from the circulator to create eddies that continuously re-entrain small bubbles without coalescing them into large bubbles;

Sufficient hose length to produce micro-bubbles (e.g. 2 linear feet of 1" diameter hose per cubic foot of air),
  a. Inside the chassis of prior art designs there is insufficient room to fit the required length of hose (e.g. in the previous YF design, the maximum amount of linear feet of hose was 1 linear foot per cubic foot of air added);

Curvilinear outflow with a significant visible cross-flow vector salvages large bubbles occluding them to the growth surface for a time sufficient to transfer their interior oxygen to the growth surface;

One header: one set of concentric rings to offset the 9" pressure difference between the upper and lower set of hoses,
  b. This makes sure that airflow is substantially equalized between the lower set of rings and the upper set of rings,
    i. Skilled artisans may place all the rings on the same level without deviating from the present invention;

External bubble generation with an elevation intermediate between the circulator (pump) inlet and outlet,
  c. If the bubbles were below the inlet, some of the bubbles would be sucked into the inlet and coalesce,
  d. If the bubble were above the outlet, they would not be entrained in the horizontal outflowing water; and
External hoses,
  e. This prevents trash fouling of internal hoses and inhibits bubble coalescing inside the pump chassis,
    i. Trash flows through the pump and then over the submerged rings without contacting the rings.

In another embodiment, multiple YF 1402 are arranged in clusters. When two aerators are closer than 80 ft (center-to-center), the outflow from one aerator and an adjacent aerator have equal and opposite horizontal vectors. When these vectors meet, a hydraulic wall is formed. When two splashers throw droplets into the air, a hydraulic wall forms where the droplet horizontal vectors are equal and opposite. But hydraulic walls are transfer vectors for moving surface substrate down to the horizontal granules on the pond floor. Some clusters have hydraulic walls wherein the number of hydraulic walls is the same or greater than the number of circulators.

Hydraulic walls are particularly valuable when maximizing growth of nitrifiers in cold weather. The walls transport ammonia and produced nitrite down to the bio-granules. Over time a very specialized, well-known bacterium (Anammox) converts ammonium and nitrite directly into nitrogen gas. Very low winter ammonia levels become possible.

What is unexpected is that that when vertical bubbles rise into well-mixed radially outflowing surface water that aerator efficiency doubles to 2 lbs O$_2$/hp×hr.

When such an aerator is combined with radially aligned, semi-permeable matrix surfaces, such as in the YF 1402 described above, the aerobic surface becomes self-cleaning and nitrification bacteria can compete successfully with carbon bacteria in an oxygen stressed environment.

In addition, when aerators and spokes are clustered such that the number of hydraulic walls is equal to or greater than the number of circulators, then cold weather nitrification is possible in the warmest cell in the system.

Gold Frog

Figure 14:
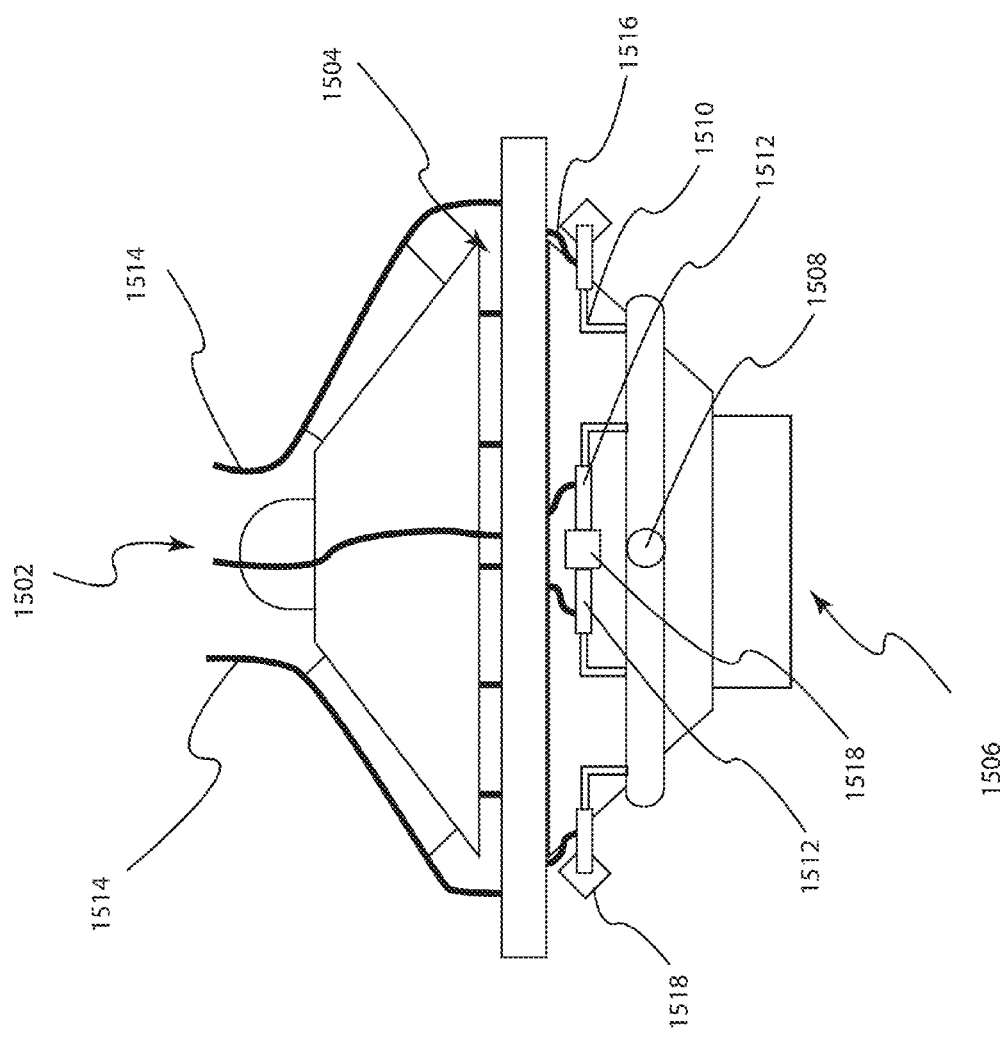
FIG. 14 illustrates a schematic representation of an aerator apparatus of the present invention.

The Gold Frog (GF) 1502, shown in FIG. 14, is an aerator with one or more air jets 1518 for injecting an external source of air bubbles at a vertical position between the water inlet 1506 and water outlet 1504. The injected air bubbles rise under the well-mixed radially outflowing water ejected from the water outlet 1504. The rising air bubbles elevate the outflowing water above the mean elevation of the surrounding water such that gassy water flows left and right. The internal components of the GF are similar to those shown in FIG. 1, thus only distinguishing features are shown in FIG. 14.

In an embodiment of the present invention, two impinging venturis 1512, are disposed within the air jets 1518 in order to generate a high volume of micro air bubbles in a jet of water emitted through the air jet 1518. Water is drawn into the venturis 1512 through a water inlet 1508 and piping 1510. Additionally, air intake hoses 1514 are provided above the water surface which feed air to the venturis 1512 by way of respective air hoses 1516. Each of the impinging venturis 1512 directs jets of micro air bubbles at one another at a closing velocity of approximately 7 ft/sec and a downward angle of 15°. Flow rates between 2 MG/D and 7 MG/D will work. Skilled artisans can adjust the downward angle to maximize detention time in the water column without deviating from the present invention. The impingement fractures small bubbles into micron-sized bubbles; the downward angle maximizes the time the bubbles are in the water column.

The shear from impinging venturis 1512, wherein each venturi 1512 has turbulent flow, will hydrolyze triglycerides into fatty acid and glycerin. The fatty acid (soap) in turn lowers the surface tension of the water. Lower surface tension ("wetter water") is particularly advantageous with land application of wastewater from manure ponds and municipal waste.

Wetter water soaks into soil faster and does not form puddles or run off into streams. In a municipal waste lagoon system with a GF 1502, surface tension was reduced 17.5%. In a dairy-processing lagoon, the surface tension was reduced 49.9% (to 36.35 mN/m). In a dairy manure lagoon, surface tension was reduced 39.6%.

What has also been discovered is that the impinging venturis physically rupture bacteria, like *E. coli*, and also rupture large algae. Micro algae about 1 micron diameter are not ruptured. In a municipal holding pond, the algae actual count were reduced 50% when passing through the GF.

The 17.5% reduction in surface tension in the municipal pond is due to physically rupturing the bacteria and algae and then hydrolyzing the minute stores of fat in individual organism. The 49.9% reduction in surface tension in the dairy processing pond is a combination of direct hydrolysis of dairy processing fat plus the rupturing and subsequent hydrolysis of bacterial fat. The dairy pond did not have algae. Hydrolyzing the fat that entered the dairy manure lagoon lowered the surface tension.

Originally, the design of the GF venturis had significant backpressure (sum of friction flow in the transfer piping, 2 ft submersion from the surface and backpressure from 7 MG/D flow through the annular space at the GF outlet.)

The present embodiment eliminates hoses inside the chassis that transfer gassy water present in the prior art. The impingement T is rotated horizontal to an elevation intermediate between the inlet and the outlet of the circulator. The impingement T exit is angled at −15° from the horizontal such that each pair of venturis discharges microbubbles down-then-up such that the net flow is horizontal and under the outflowing laminar gas-free water.

Microbubbles generated by the GF 1502 rise up into the outflowing laminar flow and are entrained and made to move horizontally without any one stream intersecting with the adjacent stream, doubling the efficiency over the prior art.

Thus like the YF embodiment, the GF embodiment discharges gas at an intermediate elevation between the pump inlet and outlet where externally-generated bubbles rise vertically into horizontal outflowing laminar flow with a flow vector aligned with the centerline of the circulator and a flow vector at right angles to the centerline flow vector.

An embodiment of the GF 1502 removes the transfer line and the flow resistance and redirects the impingement T so that the discharge from the air jet 1518 is about −15° below the horizontal, about 4 inches below the water surface. The combination of eliminating back pressure and directing free flowing gassy fluid at an angle below the horizontal increased oxygen transfer efficiency by 400%.

Operating at low backpressure is well known. What is unexpected is combining low backpressure venturi operation with horizontal radial outflowing gas-free water after impingement mixing below horizontally outflowing gas-free water to detain bubbles in the water column for a time sufficient to extract 20% of the oxygen.

The venturi-equipped GF 1502 pulls 2,023 lbs $O_2$/day through the sum of the venturis. The measured oxygen transfer rate (OTR) is ~4× (max OTR=6.5 lbs $O_2$/hp×hr) the high backpressure prior design of 0.24 lbs $O_2$/hp×hr.

In the world of mechanical aerators, this is a low efficiency aerator. However, the GF 1502 provides additional advantages. The GF 1502 adds oxygen, lowers surface tension, lowers *E. coli*, and lowers TSS. In combination with a circumferential baffle and a YF, very low suspended solids are achievable.

The combination of a freestanding, wave-generating circulator with a low backpressure venturi impingement mixer (i.e. GF 1502) with a circumferential baffle creates continuous waves that partially clarify the wavy section of the pond. Gravity pulls particles down. Friction force also pulls particles down during the rising-wave half of the wave cycle. The produced "sweet" layer (~6") is low in TSS. Therefore, lower density and lower viscosity is achieved. Thin, light surface water races to the outside of the baffle and eventually enters the baffled zone at the base of the water column.

Impingement mixer aerator (GF 1502) centrifugally separates solids, and bacteria (including pathogens) and algae are physically ruptured and their stored fat is hydrolyzed into fatty acid. Effluent is removed from the quiescent settling section as well.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:
1. A circulating apparatus comprising:
   an upper float chassis with a wider lower base thereof being equipped with an annular water outflow lip at essentially a surface level of water;
   motor-driven means being mounted on the upper float chassis for drawing water into a water intake at a lower open end of the circulating apparatus for effectuating a flow of water over the water outflow lip; and
   a first set of concentric air hoses disposed at a first position between the water outflow lip and the water intake, the first set of concentric air hoses being in fluid communication with an air inlet disposed at a position on the upper float chassis above the surface level of the water.
2. The circulating apparatus as in claim 1, wherein the first set of concentric air hoses are disposed more than 2× deeper than the depth of a gas-free discharge from the circulating apparatus below the surface level of the water.
3. The circulating apparatus as in claim 2, further comprising a second set of concentric air hoses disposed at a second position between the first set of concentric air hoses and the water intake, the second set of concentric air hoses being in fluid communication with the air inlet, the second set of concentric air hoses being horizontally offset from the first set of concentric air hoses such that air bubbles emitted by the second set of concentric air hoses rise to the surface level of the water between adjacent centric air hoses of the first set of concentric air hoses,
   wherein the first set of concentric air hoses and the second set of concentric air hoses emit jets of air bubbles into a water column between the water intake and the water outflow lip.
4. The circulating apparatus as in claim 3, wherein the second set of concentric air hoses are disposed more than 4× the depth of the gas-free discharge from the circulating apparatus below the surface level of the water.
5. The circulating apparatus as in claim 1, further comprising:
   a plurality of spokes extending radially outward from the upper float chassis at intervals around a circumference thereof; and respective vertical growth surfaces attached at one end to respective spokes of the plurality of spokes, and extending downward into a water column, the vertical growth surfaces providing a substrate for aerobic fauna colonization.

6. The circulating apparatus as in claim 5, wherein the plurality of spokes each measure 15 feet or less.

7. The circulating apparatus as in claim 5, wherein the respective vertical growth surfaces measure about 27 inches in the vertical direction and extend substantially the length of the respective spokes in the horizontal direction.

8. A circulating apparatus comprising:
an upper float chassis with a wider lower base thereof being equipped with an annular water outflow lip at essentially a surface level of the water;
motor-driven means being mounted on the upper float chassis for drawing water into a water intake at a lower open end of the circulating apparatus for effectuating a flow of the water over the water outflow lip; and
an air injector disposed between the surface level of the water and the water intake, the air injector comprising a pair of venturis configured with respective outflows directed to impinge on each other, the air injector being configured to emit a high volume of air bubbles more than 500 standard cubic feet per hour mixed with water.

9. The circulating apparatus as in claim 8, wherein the air injector is configured to direct a jet of air bubbles and water at an angle down from horizontal sufficient to transport bubbles at least one circulating apparatus diameter away from the edge of the circulating apparatus.

10. The circulating apparatus as in claim 8, wherein the air injector is disposed at least one times a gas-free water discharge depth below the surface level of the water.

11. A method of treating wastewater in a waste holding pond containing sludge, comprising:
operating a circulator with a unidirectional rotating impeller to introduce fluid flow cavitation;
forming granule seeds composed of mineral salts selected for encouraging biofilm formation in an aerated shear field of the circulator; and
discharging the granule seeds at a base of a water column of the waste holding pond.

12. The method as in claim 11, wherein the granule seeds provide a surface for facultative and anaerobic bacteria to attach and grow.

13. The method as in claim 12, wherein the granule seeds form a fluidized bed in which upwellings of methane maintain at least some of the granule seeds in suspension.

14. The method as in claim 12, wherein polyvalent cation salts accumulate on the granule seeds.

15. The method as in claim 14, wherein accumulated polyvalent salt causes the granule seeds to form granules that grow in size until the granules fall out of suspension based on the mass of the granules.

16. The method as in claim 15, wherein the granules settle onto a recalcitrant sludge bed, and form methane gas by digestion of biosolids in the recalcitrant sludge bed by the biofilm on the granules.

17. A system for treating wastewater, comprising:
a circulator for circulating wastewater within a water column of a waste treatment pond; and
a plurality of granule seeds comprised of a polyvalent salt and adapted to foster facultative and anaerobic bacterial growth on an external surface thereof,
wherein the plurality of granule seeds are introduced into the water column to form an initial fluidized bed of granules, the granules being kept in suspension by upwellings of methane.

18. The system as in claim 17, wherein calcium is accumulated on the granule seeds.

19. The system as in claim 18, wherein accumulated calcium causes the granule seeds to form granules that grow in size to a point where the granules fall out of suspension based on the mass of the granules.

20. The system as in claim 19, wherein the granules settle onto a recalcitrant sludge bed, and form methane gas by digestion of biosolids in the recalcitrant sludge bed by the bacteria on the granules.

* * * * *